United States Patent
Nam et al.

(10) Patent No.: US 12,218,757 B2
(45) Date of Patent: Feb. 4, 2025

(54) HYBRID AUTOMATIC REPEAT REQUEST (HARQ) PROCESS SHARING ACROSS CARRIERS

(71) Applicant: QUALCOMM Incorporated, San Diego, CA (US)

(72) Inventors: Wooseok Nam, San Diego, CA (US); Tao Luo, San Diego, CA (US)

(*) Notice: Subject to any disclaimer, the term of this patent is extended or adjusted under 35 U.S.C. 154(b) by 344 days.

(21) Appl. No.: 17/356,969

(22) Filed: Jun. 24, 2021

(65) Prior Publication Data
US 2021/0409160 A1 Dec. 30, 2021

Related U.S. Application Data

(60) Provisional application No. 63/044,187, filed on Jun. 25, 2020.

(51) Int. Cl.
*H04L 1/1812* (2023.01)
*H04L 27/26* (2006.01)
*H04W 8/24* (2009.01)
*H04W 72/23* (2023.01)

(52) U.S. Cl.
CPC ...... *H04L 1/1812* (2013.01); *H04L 27/26025* (2021.01); *H04W 8/24* (2013.01); *H04W 72/23* (2023.01)

(58) Field of Classification Search
CPC ............. H04L 1/1812; H04L 27/26025; H04L 5/0055; H04L 1/1822; H04L 1/1887; H04L 5/001; H04L 1/1861; H04W 8/24; H04W 72/23
See application file for complete search history.

(56) References Cited

U.S. PATENT DOCUMENTS

| | | | |
|---|---|---|---|
| 2010/0312994 A1* | 12/2010 | McBeath | H04L 1/1822 712/E9.016 |
| 2012/0057529 A1 | 3/2012 | Seo et al. | |
| 2013/0051289 A1* | 2/2013 | Hsieh | H04L 1/1845 370/280 |
| 2014/0078944 A1* | 3/2014 | Yang | H04L 5/0055 370/280 |
| 2015/0055589 A1 | 2/2015 | Yerramalli et al. | |

(Continued)

FOREIGN PATENT DOCUMENTS

WO WO-2018175820 A1 * 9/2018 ........... H04L 1/1854

OTHER PUBLICATIONS

International Search Report and Written Opinion—PCT/US2021/039075—ISA/EPO—Oct. 4, 2021.

(Continued)

*Primary Examiner* — Jamal Javaid
*Assistant Examiner* — Ryan C Kavleski

(57) ABSTRACT

Techniques and apparatus for sharing hybrid automatic repeat request (HARQ) processes across component carriers (CCs) are described. An example technique involves identifying a carrier aggregation (CA) configuration in which at least a first CC of a plurality of CCs is aggregated with at least a second CC of the plurality of CCs. A HARQ configuration indicating a pool of HARQ processes shared by at least the first CC and the second CC is received from a base station (BS). Communications are performed with the BS on at least one of the first CC or the second CC, based at least in part on the HARQ configuration.

30 Claims, 7 Drawing Sheets

(56) References Cited

U.S. PATENT DOCUMENTS

| | | | |
|---|---|---|---|
| 2015/0103752 A1 | 4/2015 | Yu et al. | |
| 2018/0278374 A1* | 9/2018 | Zeng | H04L 1/1896 |
| 2018/0279360 A1* | 9/2018 | Park | H04W 72/23 |
| 2019/0215104 A1 | 7/2019 | Salem et al. | |
| 2020/0028635 A1* | 1/2020 | Lee | H04L 5/0094 |
| 2021/0028909 A1* | 1/2021 | Gaal | H04L 1/1864 |

OTHER PUBLICATIONS

Nokia, et al., "On NR Carrier Aggregation," 3GPP Draft, 3GPP TSG-RAN WG1 Meeting #88b, R1-1705249 Carrieraggregation_Final, 3RD Generation Partnership Project (3GPP), Mobile Competence Centre, 650, Route Des Lucioles, F-06921, Sophia-Antipolis Cedex, France, vol. RAN WG1, No. Spokane, WA, USA, Apr. 3, 2017-Apr. 7, 2017, Apr. 2, 2017 (Apr. 2, 2017), XP051243380, 6 pages, Retrieved from the Internet: URL: http://www.3gpp.org/ftp/Meetings_3GPP_SYNC/RAN1/Docs/ [retrieved on Apr. 2, 2017], p. 5.

Nokia, et al., "Solutions for Wider Bandwidth Options,", 3GPP Draft, 3GPP TSG-RAN WG1 Meeting #88b, R1-1703193, Carrieraggregation, 3RD Generation Partnership Project (3GPP), Mobile Competence Centre, 650, Route Des Lucioles, F-06921, Sophia-Antipolis Cedex, France, vol. RAN WG1, No. Athens, Greece; Feb. 13, 2017-Feb. 17, 2017, Feb. 12, 2017 (Feb. 12, 2017), XP051210327, 12 pages, Retrieved from the Internet: URL: http://www.3gpp.org/ftp/Meetings_3GPP_SYNC/RAN1/Docs/ [retrieved on Feb. 12, 2017] p. 7.

* cited by examiner

HYBRID AUTOMATIC REPEAT REQUEST (HARQ) PROCESS SHARING ACROSS CARRIERS

CROSS-REFERENCE TO RELATED APPLICATION

This application claims the benefit of and priority to U.S. Provisional Application No. 63/044,187, filed Jun. 25, 2020, which is assigned to the assignee hereof and hereby expressly incorporated by reference herein.

BACKGROUND

I. Field of the Disclosure

Aspects of the present disclosure relate to wireless communications, and more particularly, to techniques for sharing a pool of hybrid automatic repeat request (HARQ) processes across component carriers (CCs).

II. Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved use of HARQ processes in a network.

Certain aspects of the subject matter described in this disclosure can be implemented in a method for wireless communication performed by a user equipment (UE). The method generally includes identifying a carrier aggregation (CA) configuration in which at least a first component carrier (CC) of a plurality of CCs is aggregated with at least a second CC of the plurality of CCs. The method also includes receiving, from a base station (BS), a hybrid automatic repeat request (HARQ) configuration indicating a pool of HARQ processes shared by at least the first CC and the second CC. The method further includes performing communications with the BS on at least one of the first CC or the second CC, based at least in part on the HARQ configuration.

Certain aspects of the subject matter described in this disclosure can be implemented in an apparatus for wireless communication. The apparatus may include a processing system, comprising: a memory comprising computer-executable instructions and one or more processors configured to execute the computer-executable instructions and cause the processing system to identify a CA configuration in which at least a first CC of a plurality of CCs is aggregated with at least a second CC of the plurality of CCs. The apparatus may also include a receiver configured to receive, from a BS, a HARQ configuration indicating a pool of HARQ processes shared by at least the first CC and the second CC. The one or more processors are further configured to cause the processing system to perform communications with the BS on at least one of the first CC or the second CC, based at least in part on the HARQ configuration.

Certain aspects of the subject matter described in this disclosure can be implemented in an apparatus for wireless communication. The apparatus may include means for identifying a CA configuration in which at least a first CC of a plurality of CCs is aggregated with at least a second CC of the plurality of CCs. The apparatus also includes means for receiving, from a BS, a HARQ configuration indicating a pool of HARQ processes shared by at least the first CC and the second CC. The apparatus further includes means for performing communications with the BS on at least one of the first CC or the second CC, based at least in part on the HARQ configuration.

Certain aspects can be implemented in a non-transitory computer-readable medium for wireless communication by a UE. The non-transitory computer-readable medium may comprise computer-executable instructions that, when executed by one or more processors of a processing system, cause the processing system to: identify a CA configuration in which at least a first CC of a plurality of CCs is aggregated with at least a second CC of the plurality of CCs; receive, from a BS, a HARQ configuration indicating a pool of HARQ processes shared by at least the first CC and the second CC; and perform communications with the BS on at least one of the first CC or the second CC, based at least in part on the HARQ configuration.

Certain aspects can be implemented in a computer program product for wireless communication by a UE embodied on a computer-readable storage medium. The computer-readable storage medium may include code for: identifying a CA configuration in which at least a first CC of a plurality of CCs is aggregated with at least a second CC of the plurality of CCs; receiving, from a BS, a HARQ configuration indicating a pool of HARQ processes shared by at least the first CC and the second CC; and performing communications with the BS on at least one of the first CC or the second CC, based at least in part on the HARQ configuration.

Certain aspects of the subject matter described in this disclosure can be implemented in a method for wireless communication performed by a base station (BS). The method generally includes identifying a CA configuration in which at least a first CC of a plurality of CCs is aggregated with at least a second CC of the plurality of CCs. The method also includes determining a HARQ configuration comprising a pool of HARQ processes shared by at least the first CC and the second CC. The method further includes signaling an indication of the HARQ configuration to a UE.

Certain aspects of the subject matter described in this disclosure can be implemented in an apparatus for wireless communication. The apparatus may include a processing system, comprising: a memory comprising computer-executable instructions and one or more processors configured to execute the computer-executable instructions and cause the processing system to: identify a CA configuration in which at least a first CC of a plurality of CCs is aggregated with at least a second CC of the plurality of CCs; and determine a HARQ configuration comprising a pool of HARQ processes shared by at least the first CC and the second CC. The apparatus also includes a transmitter configured to transmit an indication of the HARQ configuration to a UE.

Certain aspects of the subject matter described in this disclosure can be implemented in an apparatus for wireless communication. The apparatus may include means for identifying a CA configuration in which at least a first CC of a plurality of CCs is aggregated with at least a second CC of the plurality of CCs. The apparatus also includes means for determining a HARQ configuration comprising a pool of HARQ processes shared by at least the first CC and the second CC. The apparatus further includes means for signaling an indication of the HARQ configuration to a UE.

Certain aspects can be implemented in a non-transitory computer-readable medium for wireless communication by a network entity, such as a BS. The non-transitory computer-readable medium may comprise computer-executable instructions that, when executed by one or more processors of a processing system, cause the processing system to: identify a CA configuration in which at least a first CC of a plurality of CCs is aggregated with at least a second CC of the plurality of CCs; determine a HARQ configuration comprising a pool of HARQ processes shared by at least the first CC and the second CC; and signal an indication of the HARQ configuration to a UE.

Certain aspects can be implemented in a computer program product for wireless communication by a base station embodied on a computer-readable storage medium. The computer-readable storage medium may include code for: identifying a CA configuration in which at least a first CC of a plurality of CCs is aggregated with at least a second CC of the plurality of CCs; determining a HARQ configuration comprising a pool of HARQ processes shared by at least the first CC and the second CC; and signaling an indication of the HARQ configuration to a UE.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
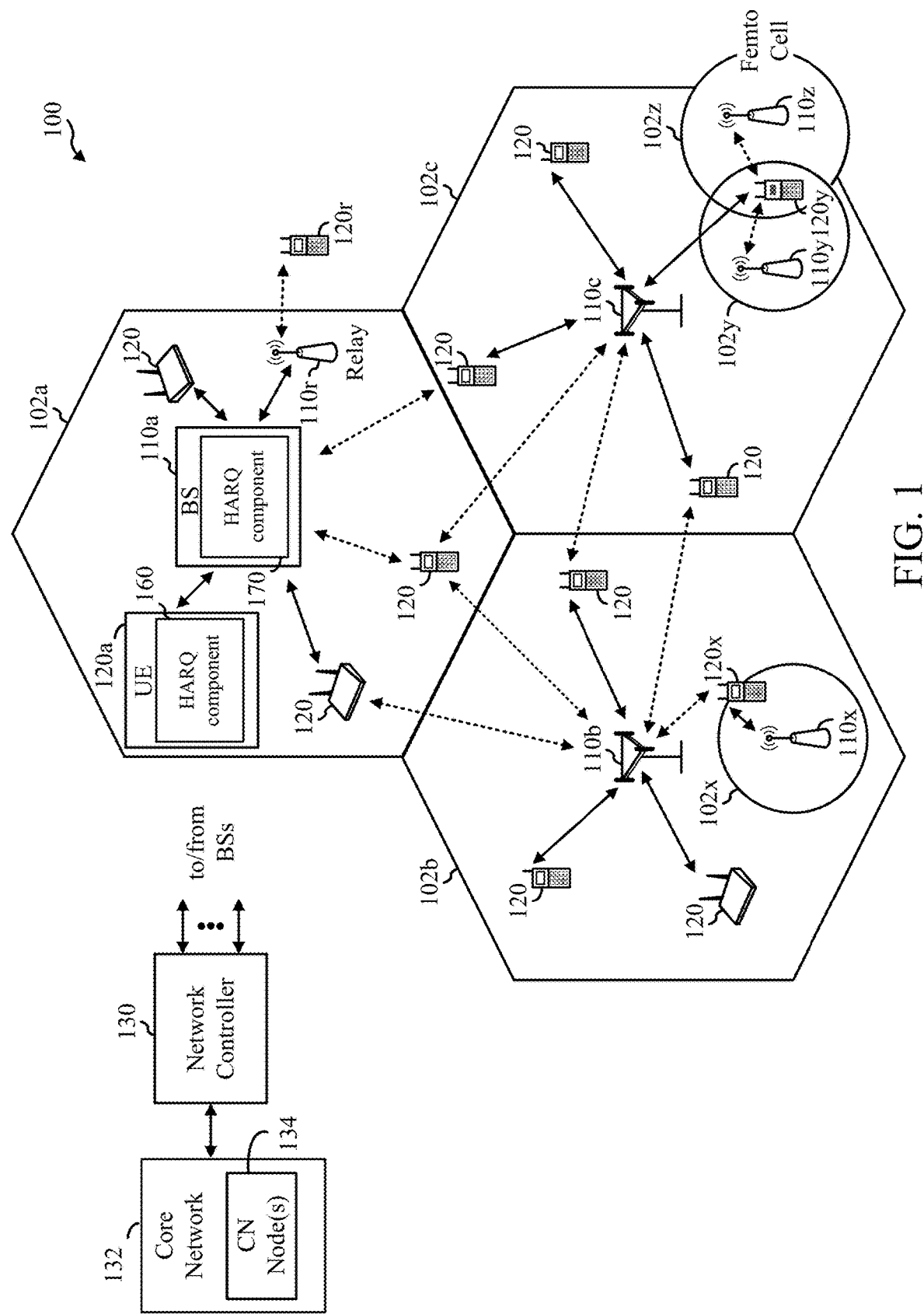
FIG. 1 is a block diagram conceptually illustrating an example telecommunications system, in accordance with certain aspects of the present disclosure.

Aspects of the present disclosure provide apparatus, methods, processing systems, and computer readable mediums for sharing a pool of hybrid automatic repeat request (HARQ) processes across multiple component carriers (CCs).

NR may support carrier aggregation (CA) configurations with component carriers (CCs) located in different operating bands or frequency ranges. For example, NR may support one or more operating bands in a frequency range 1 (FR1) and one or more operating bands in a frequency range 2 (FR2). FR1 may be approximately between 410 megahertz (MHz) and 7125 MHz and FR2 may be approximately between 24250 MHz and 52600 MHz. In some cases, NR may also support operations in higher frequency bands (e.g., ~60 gigahertz (GHz) band).

NR may support CA configurations with FR1 operating band(s), FR2 operating band(s), and higher frequency bands. As an example, NR may support a CA configuration in which one or more CCs (or cells) in a higher frequency band (e.g., ~60 GHz) are combined (or aggregated) with one or more CCs (or cells) in a lower frequency band (e.g., FR1/FR2). Each operating band may have a different numerology. As used herein, the term numerology generally refers to a set of parameters that define a structure of time and frequency resources used for communication. Such parameters may include, for example, subcarrier spacing, type of cyclic prefix, and transmission time intervals (TTIs) (e.g., such as subframe or (mini-)slot durations).

In some CA scenarios, the different numerologies that are used for the aggregated CCs may involve different maximum numbers of HARQ processes for each CC, leading to increased complexity in the communication system. Moreover, if the maximum number of processes for each CC is limited to reduce the complexity, the performance of the communication system can be compromised.

To address this, aspects provide techniques that allow devices (e.g., gNB and/or UE) to share a pool of HARQ processes across multiple CCs. In aspects, a common pool of DL/UL HARQ processes can be shared across all CCs or within one or more groups of CCs. The CC group(s) may depend on a particular frequency band, frequency range, type of spectrum (e.g. licensed/unlicensed), subcarrier spacing, numerology, etc. By enabling devices to share a pool of HARQ processes, aspects allow for efficient use of HARQ processes in a communication network.

The following description provides examples of sharing HARQ processes in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs 110 and provide coordination and control for these BSs 110 (e.g., via a backhaul).

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

According to certain aspects, the BSs 110 and UEs 120 may be configured for to share a pool of HARQ processes across multiple CCs. As shown in FIG. 1, the BS 110a includes a HARQ component 170, which is configured to implement one or more techniques described herein for sharing a pool of HARQ processes across multiple CCs. Using the HARQ component 170, the BS 110a may identify a CA configuration in which a first CC (or cell) is aggregated with at least a second CC (or cell). The BS 110a (via the HARQ component 170) may determine a HARQ configuration that includes a pool of HARQ processes shared by at least the first CC and the second CC. The BS 110a (via the HARQ component 170) may signal an indication of the HARQ configuration to a UE (e.g., UE 120a).

As also shown, the UE 120a includes a HARQ component 160, which is configured to implement one or more techniques described herein for sharing a pool of HARQ processes across multiple CCs. Using the HARQ component 160, the UE 120a may identify a CA configuration in which a first CC (or cell) is aggregated with at least a second CC (or cell). The UE 120a (via the HARQ component 160) may receive, from a BS (e.g., BS 110a), a HARQ configuration indicating a pool of HARQ processes shared by at least the first CC and the second CC. The UE 120a (via the HARQ component 160) may perform communications with the BS on at least one of the first CC or the second CC, based at least in part on the HARQ configuration.

Figure 2:
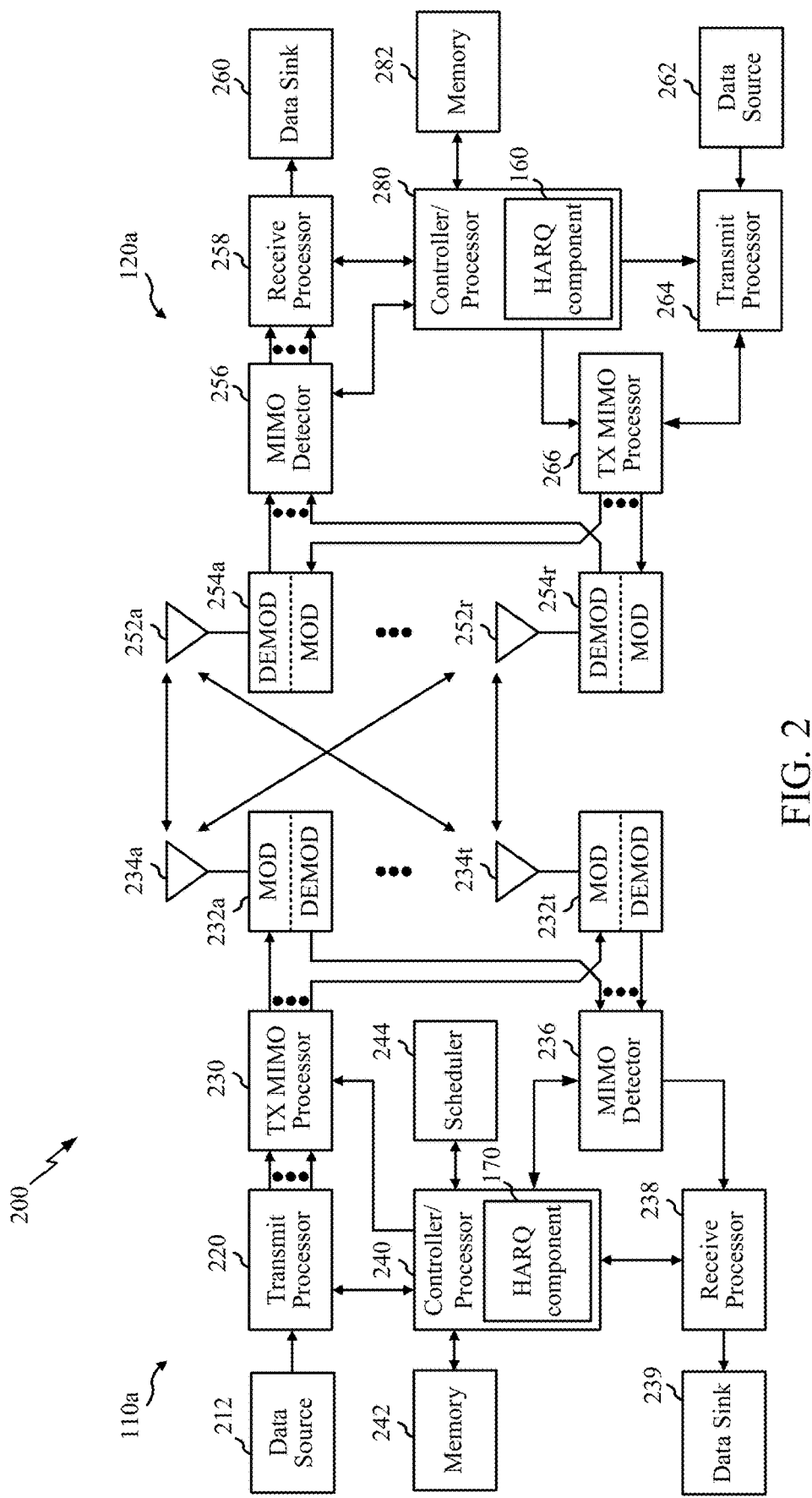
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120*a*. The receive processor 238 may provide the decoded data to a data sink 239 and the decoded control information to the controller/processor 240.

The memories 242 and 282 may store data and program codes for BS 110*a* and UE 120*a*, respectively. A scheduler 244 may schedule UEs for data transmission on the downlink and/or uplink.

Antennas 252, processors 266, 258, 264, and/or controller/processor 280 of the UE 120*a* and/or antennas 234, processors 220, 230, 238, and/or controller/processor 240 of the BS 110*a* may be used to perform the various techniques and methods described herein. For example, as shown in FIG. 2, the controller/processor 240 of the BS 110*a* has a HARQ component 170, which is configured to implement one or more techniques described herein. In one aspect, the HARQ component 170 can be used to perform one or more operations of FIG. 4. As shown in FIG. 2, the controller/processor 280 of the UE 120*a* has a HARQ component 160, which is configured to implement one or more techniques described herein. In one aspect, the HARQ component 160 can be used to perform one or more operations of FIG. 5. Although shown at the controller/processor, other components of the UE 120*a* and BS 110*a* may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
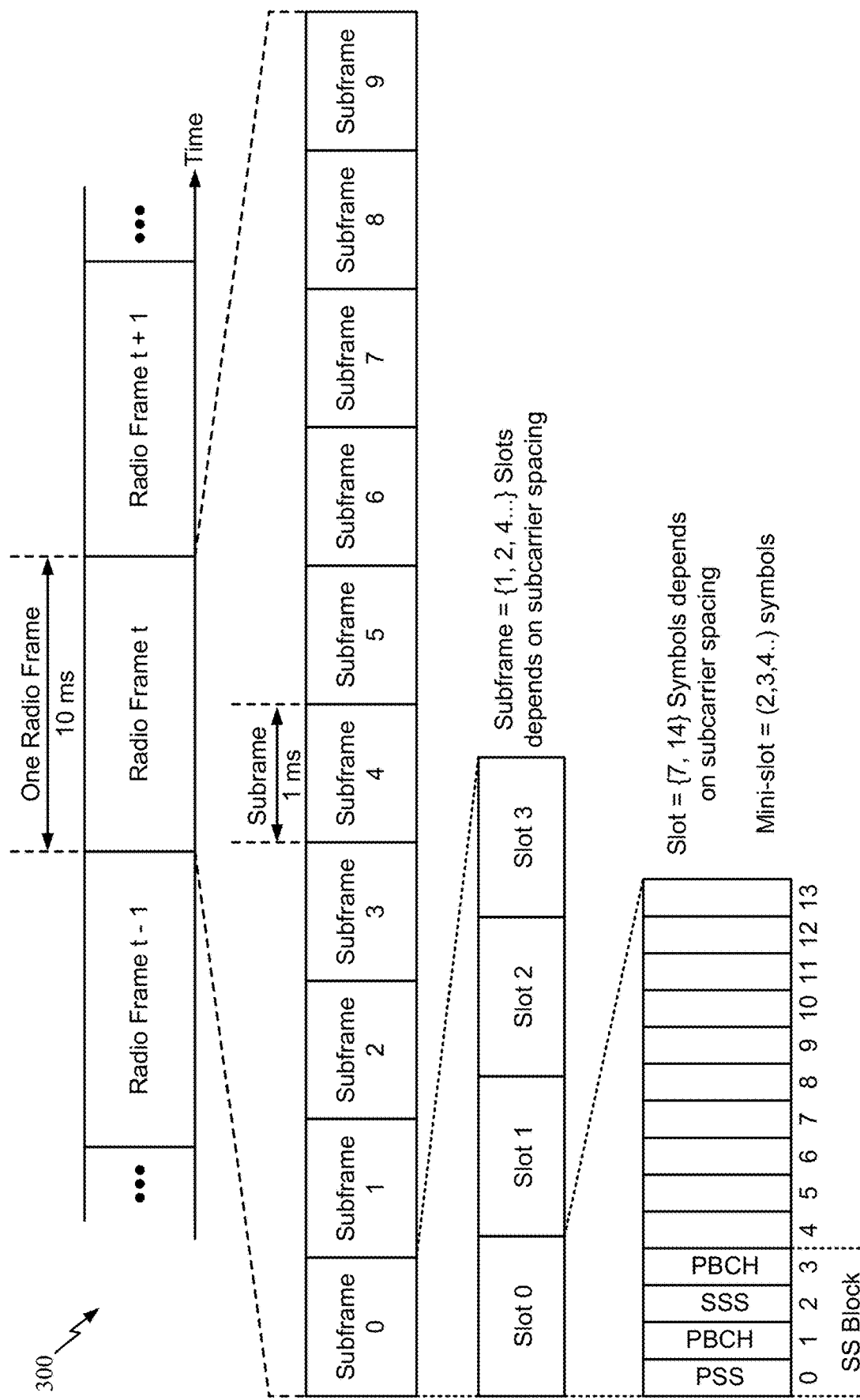
FIG. 3 is an example frame format for new radio (NR), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, the MAC entity (of each device) generally includes a HARQ entity for each serving cell, which maintains a number of parallel HARQ processes. Each HARQ process may be associated with a HARQ process identifier (ID). In NR, up to 16 parallel DL (UL) HARQ processes can be supported per cell. For DL, the higher layer parameter "nrofHARQ-ProcessesForPDSCH" indicates the number of HARQ processes for each serving cell. For URLLC operation, higher layer parameters "HARQProcessNumberSizeForDCIFormat0_2" and "HARQProcessNumberSizeForDCIFormat1_2" may indicate the number of HARQ processes for UL and DL, respectively. The number of required HARQ processes is generally related to the turn-around time of data scheduling. This turn-around time, for example, may include the time of the initial transmission to the time of potential retransmission, after receiving HARQ-ACK feedback. A longer turn-around time generally translates to a larger number of required HARQ processes.

As noted, using some numerology combinations of CCs aggregated across different frequency bands can lead to provisioning each CC with different maximum numbers of HARQ processes. This, in turn, increases the complexity of the communication system and can impact performance of the communication system. For example, in higher band NR deployments (e.g., at or around 60 GHz), a higher subcarrier spacing may be used to combat severe phase noise. However, since the slot duration generally decreases with larger subcarrier spacing, the processing timeline (or the turnaround time) (in terms of the number of slots) is relatively larger for a large subcarrier spacing, relative to a lower subcarrier spacing. Thus, compared to a lower subcarrier spacing, a higher subcarrier spacing may use a larger number of HARQ processes. In the particular example where a higher band NR deployment is used, a larger number of HARQ processes may be needed, compared to the lower band deployment.

Accordingly, it may be desirable to provide techniques that allow devices to mitigate performance impacts associated with the larger number of HARQ processes in higher band NR deployments.

Example HARQ Process Sharing Across Carriers

Aspects of the present disclosure provide techniques and apparatus for sharing a pool of HARQ processes across multiple CCs. In aspects, a common pool of DL/UL HARQ processes can be shared across all CCs or within one or more groups of CCs. The CC group(s) may depend on a particular frequency band, frequency range, type of spectrum (e.g. licensed/unlicensed), subcarrier spacing, numerology, etc. By enabling devices to share a pool of HARQ processes, aspects allow for efficient use of HARQ processes in a communication network.

In some aspects, the total number of HARQ processes (per group of CCs) may depend on the UE's capability. For example, the UE may transmit a UE capability message that indicates the total number of HARQ processes supported within the pool of HARQ processes. Additionally or alternatively, the UE may transmit another UE capability message that indicates the maximum and/or minimum number of HARQ processes supported by each CC or each group of CCs.

In some aspects, the UE capability message may provide an implicit indication of the supported number of HARQ processes (e.g., total number in pool, max/min per CC). For example, the UE capability message may provide an abstract number that represents the parallel number of supported HARQ processes. The abstract number can indicate a processing capability class, which translates to a particular number of supported HARQ processes (e.g., processing capability class A=4 supported HARQ processes, processing capability class B=6 supported HARQ processes, etc.).

In some aspects, techniques presented herein may provide a semi-static sharing of HARQ processes across CCs. Here, the BS (or network entity) may assign (or allocate) a fixed number of HARQ processes for each CC in a CA configuration. The total number of assigned HARQ processes across all CCs may not exceed the UE capability. In some aspects, a different weight may be used to count the number of HARQ processes for different CCs. Each weight for a given CC(s) may be determined based on the frequency band, frequency range, type of spectrum, subcarrier spacing, or other numerology parameters associated with the CC. For example, a HARQ process for CCs with a subcarrier spacing of 240 kHz or higher may be regarded to be equivalent as two HARQ processes for CCs with a subcarrier spacing of 120 kHz or lower. Thus, in this example, a weight=2 may be used to count a HARQ process for CC(s) with 240 kHz subcarrier spacing and a weight=1 may be used count a HARQ process for CC(s) with 120 kHz subcarrier spacing.

In addition to UE capability signaling, the UE may signal a request (or provide a recommendation) for a number of HARQ processes for each CC. The UE may provide the request via uplink control information (UCI), medium access control control element (MAC-CE) signaling, UE assistance information feedback, etc. In response to the request, the BS may (re)-assign a certain number of HARQ processes for each CC. The BS may provide the (re)-assignment through radio resource control (RRC) signaling (e.g., RRC reconfiguration), MAC-CE signaling, or downlink control information (DCI) signaling. After the (re)-assignment of the number of HARQ processes for each CC, the size of the HARQ process number ID field for a given CC in the scheduling DCI may be determined according to the number of assigned HARQ processes for the CC.

In some aspects, techniques presented herein may provide for dynamic sharing (also referred to as HARQ process overbooking) of HARQ processes across CCs. Here, similar to the semi-static sharing technique, a number of HARQ processes may be assigned for each CC by the BS, but the total number of assigned HARQ processes across CCs (or cells) may be larger than the maximum supported number of HARQ processes (based on the UE capability). However, at a given time instance, the number of total "active" HARQ processes may always be smaller than or equal to the maximum supported number of HARQ processes.

Under this scenario, if a scheduling DCI assigns a number of active HARQ processes (e.g., by assigning HARQ process ID(s)) that exceeds the maximum supported number of HARQ processes, the UE may ignore the DCI (e.g., by dropping the DCI). In some cases, if multiple scheduling DCIs across different CCs assign a number of active HARQ processes that exceeds the maximum supported number of HARQ processes, the UE may drop one or more of the scheduling DCIs using a prioritization rule. In one aspect, the prioritization rule may be a function of cell ID, HARQ process ID, etc. For example, assuming the prioritization rule is based on HARQ process ID, when multiple new HARQ processes are assigned simultaneously, they may be counted from the CCs with lowest ID and lowest HARQ process ID. Once the maximum supported number is reached, the rest of the HARQ processes may be ignored.

In some aspects, techniques presented herein may allow for a mixed mode approach between semi-static techniques and dynamic sharing techniques. For example, some CCs in a CA configuration may use the semi-static technique (described above), while other CCs in the CA configuration may use the dynamic sharing technique (described above). In another example, one or more CCs in a CA configuration can be configured with multiple control resource set (CORESET) pool indexes, where the dynamic sharing technique is used for a first CORESET pool index (e.g., CORESET pool index 0) and the semi-static technique is used for a second CORESET pool index (e.g., CORESET pool index 1). As used herein, a CORESET is generally a set of physical resources within a grid of time and frequency resources (e.g., a downlink resource grid). A CORESET can be used to carry PDCCH or other control information.

Figure 4:
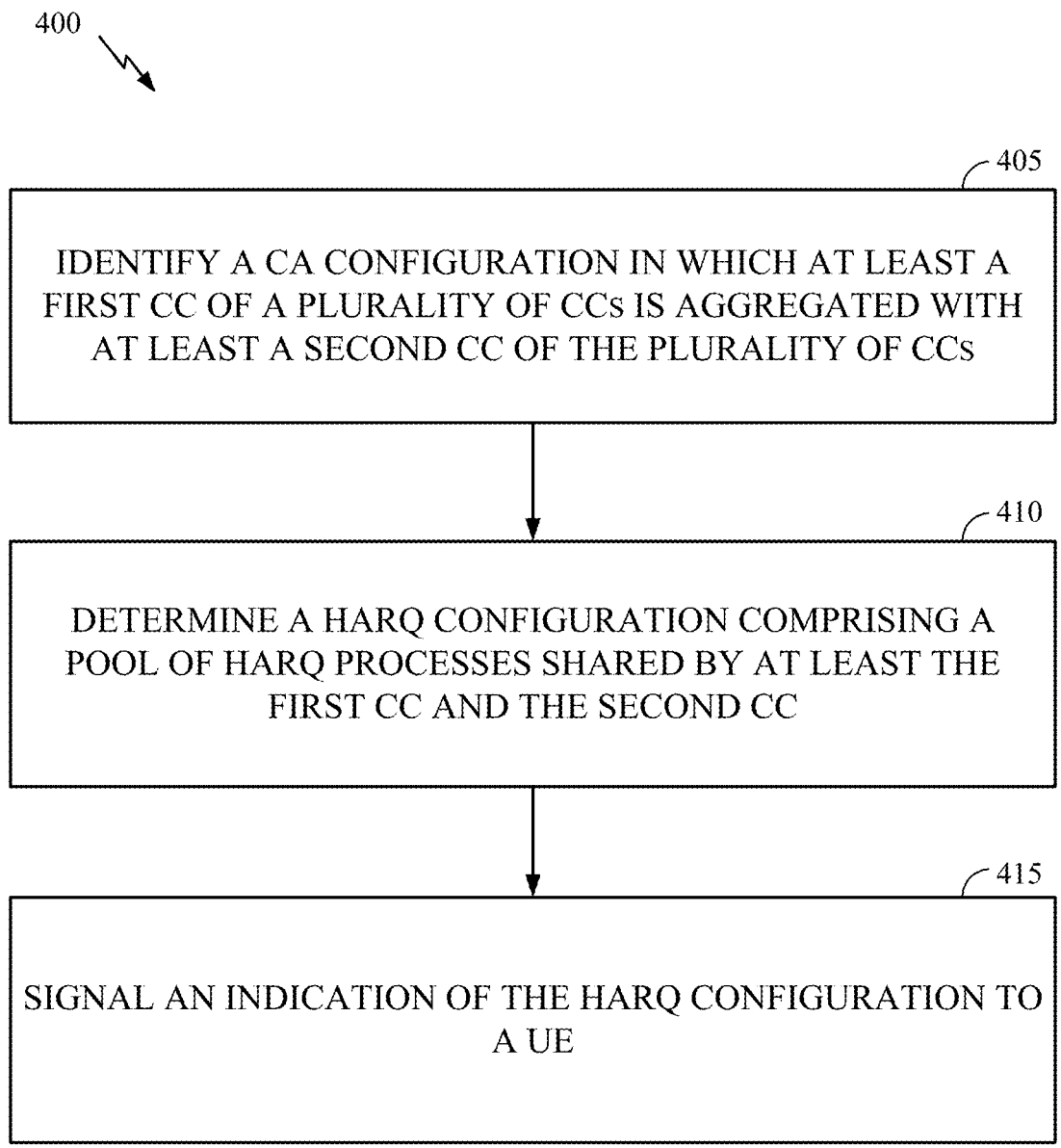
FIG. 4 is a flow diagram illustrating example operations for wireless communication by a UE, in accordance with certain aspects of the present disclosure.

FIG. 4 is a flow diagram illustrating example operations 400 for wireless communication, in accordance with certain aspects of the present disclosure. The operations 400 may be performed, for example, by a BS (e.g., such as the BS 110a in the wireless communication network 100). The operations 400 may be complimentary operations by the BS to the operations 500 performed by the UE. Operations 400 may be implemented as software components that are executed and run on one or more processors (e.g., controller/processor 240 of FIG. 2). Further, the transmission and reception of signals by the BS in operations 400 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 400 may begin, at 405, where the BS identifies a CA configuration in which at least a first CC of a plurality of CCs is aggregated with at least a second CC of the plurality of CCs. The first CC may be located in a first frequency range and the second CC may be located in a second frequency range. In some cases, the second frequency range (e.g., ~60 GHz band) may be higher than the first frequency range (e.g., FR1/FR2). The first CC may be associated with a first numerology and the second CC may be associated with a different second numerology. For example, the first numerology may use a first subcarrier spacing and the second numerology may use a second different subcarrier spacing. The second subcarrier spacing may be larger than the first subcarrier spacing.

At 410, the BS determines a HARQ configuration that includes a pool of HARQ processes shared by at least the first CC and the second CC. The pool of HARQ processes may include at least one of a number of downlink HARQ processes or a number of uplink HARQ processes. In one aspect, the pool of HARQ processes may be shared by the plurality of CCs. In one aspect, the pool of HARQ processes may be shared by a group of CCs (that includes the first CC and the second CC) within the plurality of CCs. Here, the group of CCs may include CCs associated with a frequency band, a frequency range, a licensed spectrum, an unlicensed spectrum, or a subcarrier spacing.

In some aspects, the operations 400 may further include receiving an indication of a (first) UE capability that includes a number of HARQ processes supported by the UE. The BS (at 410) may determine a number of HARQ processes in the pool of HARQ processes based on the UE capability. Additionally or alternatively, the operations 400 may further include receiving an indication of another (second) UE capability that includes at least one of a minimum number of HARQ processes or a maximum number of HARQ processes supported for each of the plurality of CCs. The BS (at 410) may determine the number of HARQ processes in the pool of HARQ processes further based on the min/max information in this other UE capability. In some cases, the first or second UE capability may include an implicit indication of the number of HARQ processes supported by the UE. For example, the implicit indication may include a processing capability class associated with the UE.

At 415, the BS signals an indication of the HARQ configuration to a UE. The HARQ configuration may allocate a first number of HARQ processes in the pool of HARQ processes to the first CC and a second number of HARQ processes in the pool of HARQ processes to the second CC. The BS may signal the indication via RRC signaling, MAC-CE signaling, or DCI signaling. In one aspect, the BS may use a scheduling DCI that includes a HARQ process number ID field for each of the first CC and the second CC. A size of the HARQ process number ID field for the first CC may be based on the first number of HARQ processes and the size of the HARQ process number ID field for the second CC may be based on the second number of HARQ processes.

In a semi-static approach, the BS (at 410) may determine the HARQ configuration, such that a sum of the first number of HARQ processes and the second number of HARQ processes is no greater than a number of HARQ processes supported by the UE. The first number of HARQ processes may be based on a first weight associated with the first CC and the second number of HARQ processes may be based on a second weight associated with the second CC. The first weight may be based on at least one of a subcarrier spacing, a frequency band, a frequency range, or a type of spectrum associated with the first CC and the second weight may be based on at least one of a subcarrier spacing, a frequency band, a frequency range, or a type of spectrum associated with the second CC.

In some aspects, the operations 400 may further include receiving a request for the first number of HARQ processes and the second number of HARQ processes. The BS (at 410) may determine the HARQ configuration in response to the request. The request may be received via at least one of UCI, MAC-CE signaling, or UE assistance information feedback.

In a dynamic sharing approach, a sum of the first number of HARQ processes and the second number of HARQ processes may be greater than a number of HARQ processes supported by the UE. In one aspect, a number of active HARQ processes in the pool of HARQ processes at a given time instance may be no greater than the number of HARQ processes supported by the UE.

In a first mixed mode approach, a first set of the plurality of CCs in the CA configuration may be allocated a number of HARQ processes in the pool of HARQ processes that is no greater than a maximum number of HARQ processes supported by the UE; and a second set of the plurality of CCs in the CA configuration may be allocated a number of HARQ processes in the pool of HARQ processes that is greater than a maximum number of HARQ processes supported by the UE.

In a second mixed mode approach, at least one of the CCs of the plurality of CCs may be associated with a first CORESET pool index and a second CORESET pool index. The first CORESET pool index may be allocated a number of HARQ processes in the pool of HARQ processes that is no greater than a maximum number of HARQ processes supported by the UE. The second CORESET pool index may be allocated a number of HARQ processes in the pool of HARQ processes that is greater than a maximum number of HARQ processes supported by the UE.

Figure 5:
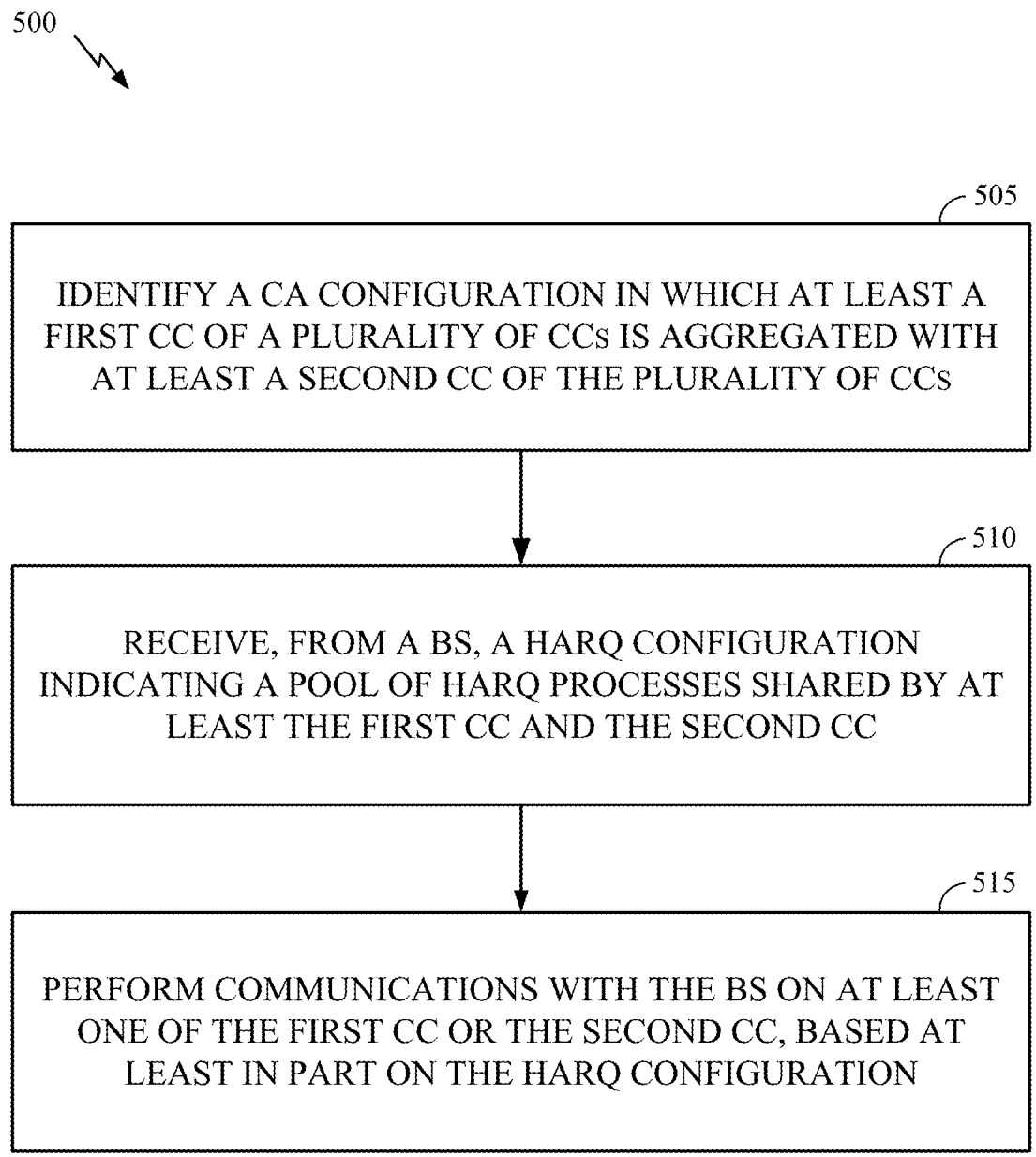
FIG. 5 is a flow diagram illustrating example operations for wireless communication by a BS, in accordance with certain aspects of the present disclosure.

FIG. 5 is a flow diagram illustrating example operations 500 for wireless communication, in accordance with certain aspects of the present disclosure. The operations 500 may be performed, for example, by UE (e.g., such as a UE 120*a* in the wireless communication network 100). The operations 500 may be complimentary operations by the UE to the operations 400 performed by the BS. Operations 500 may be implemented as software components that are executed and run on one or more processors (e.g., controller/processor 280 of FIG. 2). Further, the transmission and reception of signals by the UE in operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 500 may begin, at 505, where the UE identifies a CA configuration in which at least a first CC of a plurality of CCs is aggregated with at least a second CC of the plurality of CCs. The first CC may be located in a first frequency range and the second CC may be located in a second frequency range. In some cases, the second frequency range (e.g., ~60 GHz band) may be higher than the first frequency range (e.g., FR1/FR2). The first CC may be associated with a first numerology and the second CC may be associated with a different second numerology. For example, the first numerology may use a first subcarrier spacing and the second numerology may use a second different subcarrier spacing. The second subcarrier spacing may be larger than the first subcarrier spacing.

At 510, the UE receives, from a BS, a HARQ configuration indicating a pool of HARQ processes shared by at least the first CC and the second CC. The pool of HARQ processes may include at least one of a number of downlink HARQ processes or a number of uplink HARQ processes. In one aspect, the pool of HARQ processes may be shared by the plurality of CCs. In one aspect, the pool of HARQ processes may be shared by a group of CCs (that includes the first CC and the second CC) within the plurality of CCs. Here, the group of CCs may include CCs associated with a frequency band, a frequency range, a licensed spectrum, an unlicensed spectrum, or a subcarrier spacing. At 515, the UE performs communications with the BS on at least one of the first CC or the second CC, based at least in part on the HARQ configuration.

In some aspects, the operations 500 may further include signaling an indication of a first UE capability comprising a number of HARQ processes supported by the UE. A number of HARQ processes in the pool of HARQ processes may be based on the first UE capability. Additionally or alternatively, the operations 500 may further include signaling an indication of a second UE capability comprising at least one of a minimum number of HARQ processes or a maximum number of HARQ processes supported for each of the plurality of CCs. The number of HARQ processes in the pool of HARQ processes may be further based on the second UE capability. In some cases, the first or second UE capability may include an implicit indication of the number of HARQ processes supported by the UE. For example, the implicit indication may include a processing capability class associated with the UE.

The HARQ configuration may allocate a first number of HARQ processes in the pool of HARQ processes to the first CC and a second number of HARQ processes in the pool of HARQ processes to the second CC. The UE may receive the indication via RRC signaling, MAC-CE signaling, or DCI signaling. In one aspect, the UE may receive a scheduling DCI that includes a HARQ process number ID field for each of the first CC and the second CC. A size of the HARQ process number ID field for the first CC may be based on the first number of HARQ processes and the size of the HARQ process number ID field for the second CC may be based on the second number of HARQ processes.

In a semi-static approach, the UE (at 510) may receive a HARQ configuration, where a sum of the first number of HARQ processes and the second number of HARQ processes is no greater than a number of HARQ processes supported by the UE. The first number of HARQ processes may be based on a first weight associated with the first CC and the second number of HARQ processes may be based on a second weight associated with the second CC. The first weight may be based on at least one of a subcarrier spacing, a frequency band, a frequency range, or a type of spectrum associated with the first CC and the second weight may be based on at least one of a subcarrier spacing, a frequency band, a frequency range, or a type of spectrum associated with the second CC.

In some aspects, the operations 500 may further include signaling a request for the first number of HARQ processes and the second number of HARQ processes. The UE (at 510) may receive the HARQ configuration in response to the request. The request may be signaled via at least one of UCI, MAC-CE, or UE assistance information feedback.

In a dynamic sharing approach, a sum of the first number of HARQ processes and the second number of HARQ processes may be greater than a number of HARQ processes supported by the UE. In one aspect, a number of active HARQ processes in the pool of HARQ processes at a given time instance may be no greater than the number of HARQ processes supported by the UE. In some aspects, the UE may drop one or more of the number of active HARQ processes in the pool of HARQ processes upon determining that the number of active HARQ processes at a given time instance is larger than the number of HARQ processes supported by the UE. In one aspect, the UE may drop one or more of the active number of HARQ processes based on a predetermined rule. For example, the predetermined rule can be based on at least one of a cell ID, a HARQ process ID, or a CC ID.

In a first mixed mode approach, a first set of the plurality of CCs in the CA configuration may be allocated a number of HARQ processes in the pool of HARQ processes that is no greater than a maximum number of HARQ processes supported by the UE; and a second set of the plurality of CCs in the CA configuration may be allocated a number of HARQ processes in the pool of HARQ processes that is greater than a maximum number of HARQ processes supported by the UE.

In a second mixed mode approach, at least one of the CCs of the plurality of CCs may be associated with a first CORESET pool index and a second CORESET pool index. The first CORESET pool index may be allocated a number of HARQ processes in the pool of HARQ processes that is no greater than a maximum number of HARQ processes supported by the UE. The second CORESET pool index may be allocated a number of HARQ processes in the pool of HARQ processes that is greater than a maximum number of HARQ processes supported by the UE.

Figure 6:
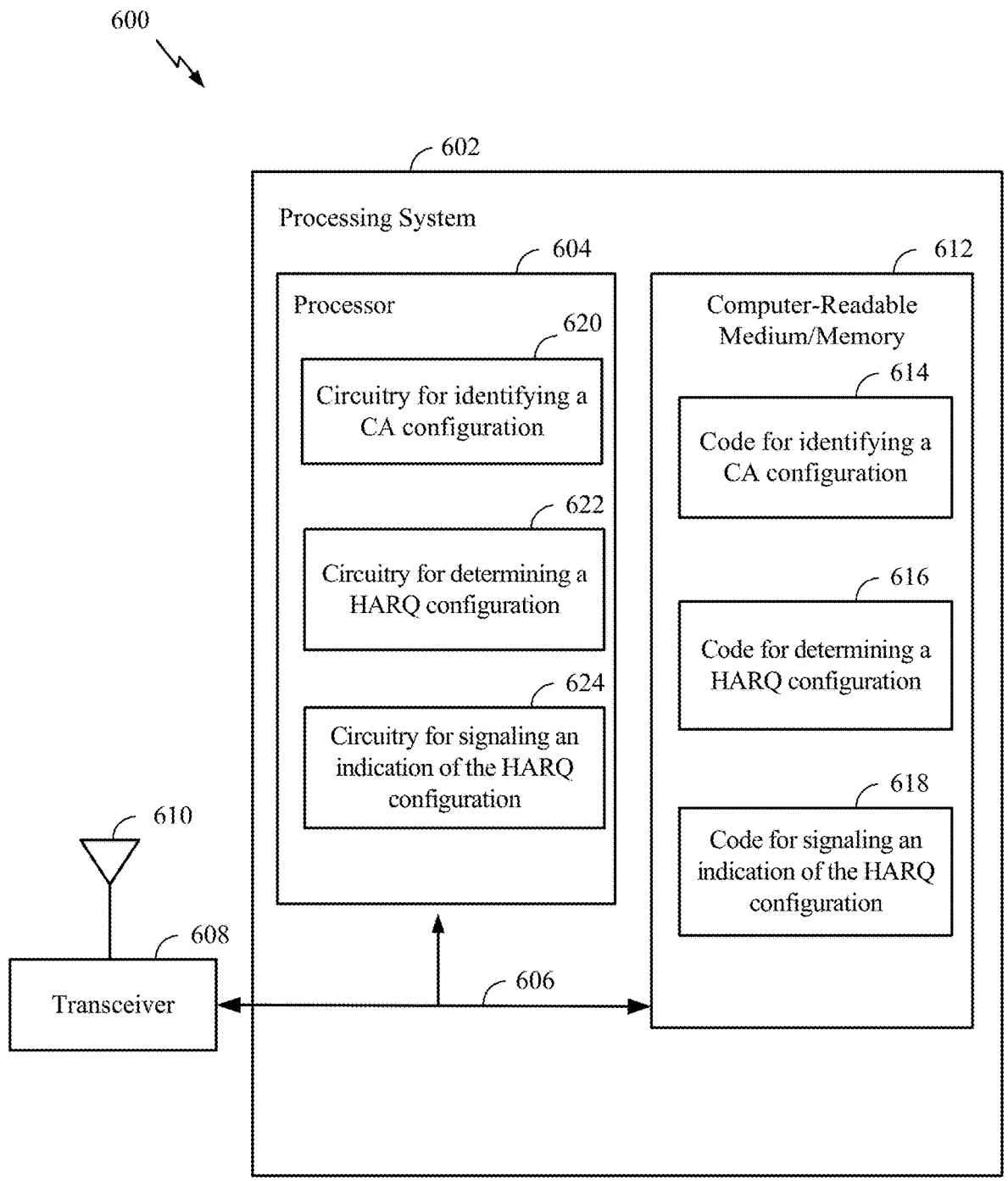
FIG. 6 illustrates a communications device that may include various components configured to perform operations for the techniques disclosed herein in accordance with aspects of the present disclosure.

FIG. 6 illustrates a communications device 600 that may include various components (e.g., corresponding to means-plus-function components) configured to perform operations for the techniques disclosed herein, such as the operations illustrated in FIG. 4. The communications device 600 includes a processing system 602 coupled to a transceiver 608 (e.g., a transmitter and/or a receiver). The transceiver 608 is configured to transmit and receive signals for the communications device 600 via an antenna 610, such as the various signals as described herein. The processing system 602 may be configured to perform processing functions for the communications device 600, including processing signals received and/or to be transmitted by the communications device 600.

The processing system 602 includes a processor 604 coupled to a computer-readable medium/memory 612 via a bus 606. In certain aspects, the computer-readable medium/memory 612 is configured to store instructions (e.g., computer-executable code) that when executed by the processor 604, cause the processor 604 to perform the operations illustrated in FIG. 4, or other operations for performing the various techniques discussed herein. In certain aspects, computer-readable medium/memory 612 stores code 614 for identifying a CA configuration in which at least a first CC of a plurality of CCs is aggregated with at least a second CC of the plurality of CCs; code 616 for determining a HARQ configuration comprising a pool of HARQ processes shared by at least the first CC and the second CC; and code 618 for signaling an indication of the HARQ configuration to a UE. In certain aspects, the processor 604 has circuitry configured to implement the code stored in the computer-readable medium/memory 612. The processor 604 includes circuitry 620 for identifying a CA configuration in which at least a first CC of a plurality of CCs is aggregated with at least a second CC of the plurality of CCs; circuitry 622 for determining a HARQ configuration comprising a pool of HARQ processes shared by at least the first CC and the second CC; and circuitry 624 for signaling an indication of the HARQ configuration to a UE.

Figure 7:
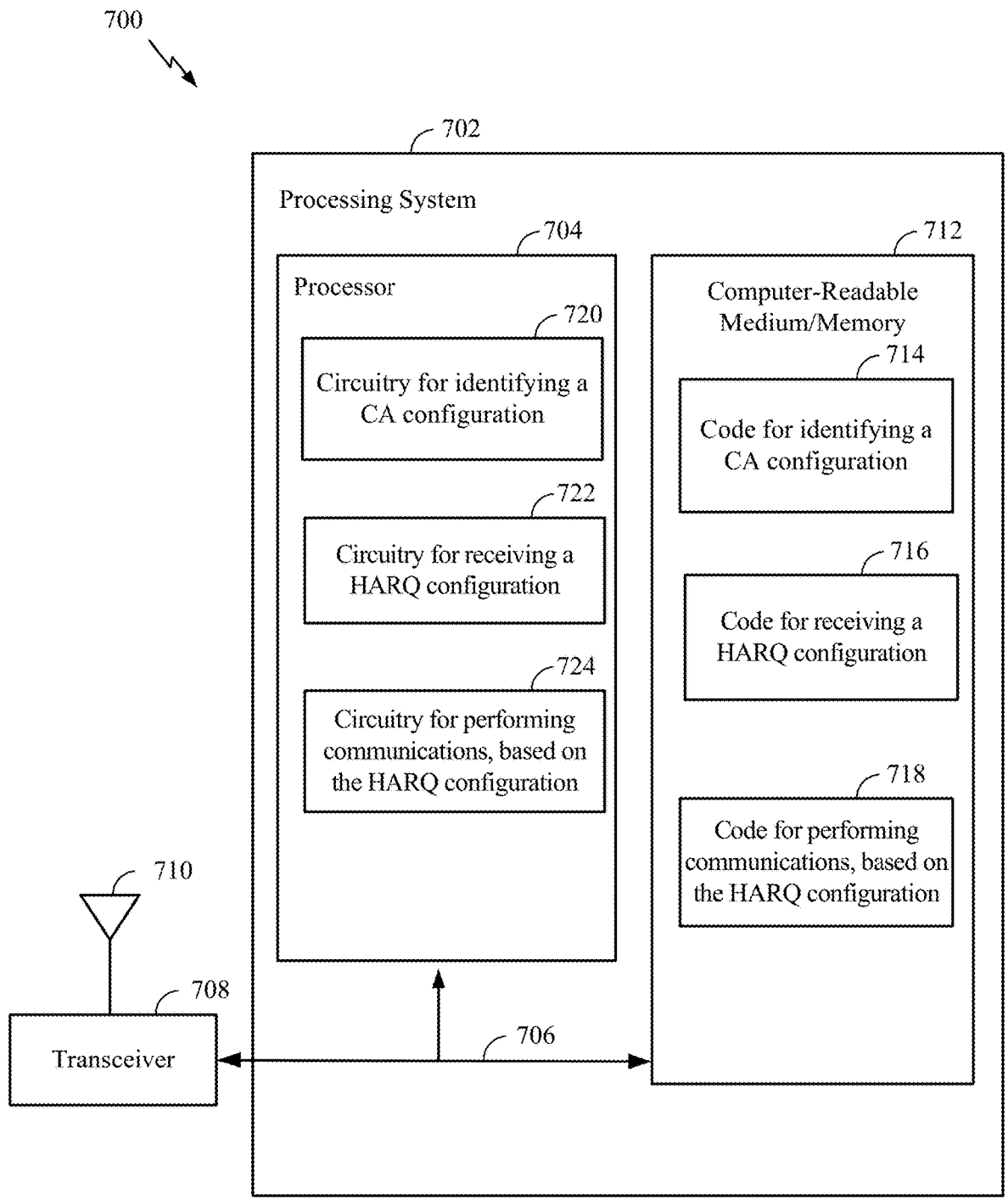
FIG. 7 illustrates a communications device that may include various components configured to perform operations for the techniques disclosed herein in accordance with aspects of the present disclosure.

FIG. 7 illustrates a communications device 700 that may include various components (e.g., corresponding to means-plus-function components) configured to perform operations for the techniques disclosed herein, such as the operations illustrated in FIG. 5. The communications device 600 includes a processing system 702 coupled to a transceiver 708 (e.g., a transmitter and/or a receiver). The transceiver 708 is configured to transmit and receive signals for the communications device 700 via an antenna 710, such as the various signals as described herein. The processing system 702 may be configured to perform processing functions for the communications device 700, including processing signals received and/or to be transmitted by the communications device 700.

The processing system 702 includes a processor 704 coupled to a computer-readable medium/memory 712 via a bus 706. In certain aspects, the computer-readable medium/memory 712 is configured to store instructions (e.g., computer-executable code) that when executed by the processor 704, cause the processor 704 to perform the operations illustrated in FIG. 5, or other operations for performing the various techniques discussed herein. In certain aspects, computer-readable medium/memory 712 stores code 714 for identifying a CA configuration in which at least a first CC of a plurality of CCs is aggregated with at least a second CC of the plurality of CCs; code 716 for receiving a HARQ configuration comprising a pool of HARQ processes shared by at least the first CC and the second CC; and code 718 for performing communications based on the HARQ configuration. In certain aspects, the processor 704 has circuitry configured to implement the code stored in the computer-readable medium/memory 712. The processor 704 includes circuitry 720 for identifying a CA configuration in which at least a first CC of a plurality of CCs is aggregated with at least a second CC of the plurality of CCs; circuitry 722 for determining a HARQ configuration comprising a pool of HARQ processes shared by at least the first CC and the second CC; and circuitry 724 for performing communications based on the HARQ configuration.

Example Clauses

Implementation examples are described in the following numbered clauses:

Clause 1: A method for wireless communication by a UE, comprising: identifying a CA configuration in which at least a first CC of a plurality of CCs is aggregated with at least a second CC of the plurality of CCs; receiving, from a BS, a HARQ configuration indicating a pool of HARQ processes shared by at least the first CC and the second CC; and performing communications with the BS on at least one of the first CC or the second CC, based at least in part on the HARQ configuration.

Clause 2: The method according to clause 1, wherein the pool of HARQ processes is shared by the plurality of CCs.

Clause 3: The method according to any of clauses 1-2, wherein the pool of HARQ processes is shared by a group of CCs, comprising the first CC and the second CC, within the plurality of CCs.

Clause 4: The method according to clause 3, wherein the group of CCs comprises CCs associated with a frequency band, a frequency range, a licensed spectrum, an unlicensed spectrum, or a subcarrier spacing.

Clause 5: The method according to any of clauses 1-4, further comprising signaling an indication of a first UE capability comprising a number of HARQ processes supported by the UE, wherein a number of HARQ processes in the pool of HARQ processes is based on the first UE capability.

Clause 6: The method according to any of clauses 1-5, further comprising signaling an indication of a second UE capability comprising at least one of a minimum number of HARQ processes or a maximum number of HARQ processes supported for each of the plurality of CCs, wherein the number of HARQ processes in the pool of HARQ processes is further based on the second UE capability.

Clause 7: The method according to any of clauses 1-5, wherein the first UE capability comprises an implicit indication of the number of HARQ processes supported by the UE.

Clause 8: The method according to any of clauses 1-7, wherein the implicit indication comprises a processing capability class associated with the UE.

Clause 9: The method according to any of clauses 1-8, wherein the HARQ configuration allocates (i) a first number of HARQ processes in the pool of HARQ processes to the first CC and (ii) a second number of HARQ processes in the pool of HARQ processes to the second CC.

Clause 10: The method according to clause 9, wherein a sum of the first number of HARQ processes and the second number of HARQ processes is no greater than a number of HARQ processes supported by the UE.

Clause 11: The method according to clause 9, wherein the first number of HARQ processes is based on a first weight associated with the first CC and the second number of HARQ processes is based on a second weight associated with the second CC.

Clause 12: The method according to clause 11, wherein the first weight is based on at least one of a subcarrier spacing, a frequency band, a frequency range, or a type of spectrum associated with the first CC and the second weight is based on at least one of a subcarrier spacing, a frequency band, a frequency range, or a type of spectrum associated with the second CC.

Clause 13: The method according to any of clauses 9-12, further comprising signaling a request for the first number of HARQ processes and the second number of HARQ processes, wherein the HARQ configuration is received in response to the request.

Clause 14: The method according to clause 13, wherein the request is signaled via at least one of a UCI, a MAC-CE, or UE assistance information feedback.

Clause 15: The method according to clause 13, wherein the HARQ configuration is received via RRC signaling, a MAC-CE, or DCI signaling.

Clause 16: The method according to clause 15, wherein: the DCI comprises a HARQ process number ID field for each of the first CC and the second CC; a size of the HARQ process number ID field for the first CC is based on the first number of HARQ processes; and a size of the HARQ process number ID field for the second CC is based on the second number of HARQ processes.

Clause 17: The method according to any of clauses 9 and 11-16, wherein a sum of the first number of HARQ processes and the second number of HARQ processes is greater than a number of HARQ processes supported by the UE.

Clause 18: The method according to clause 17, wherein a number of active HARQ processes in the pool of HARQ processes at a given time instance is no greater than the number of HARQ processes supported by the UE.

Clause 19: The method according to any of clauses 17-18, further comprising dropping one or more of a number of active HARQ processes in the pool of HARQ processes, upon determining that the number of active HARQ processes in the pool of HARQ processes at a given time instance is larger than the number of HARQ processes supported by the UE.

Clause 20: The method according to clause 19, wherein dropping one or more of the number of active HARQ processes based on a predetermined rule.

Clause 21: The method according to clause 20, wherein the predetermined rule is based on at least one of a cell identifier (ID), a HARQ process ID, or a CC ID.

Clause 22: The method according to any of clauses 1-21, wherein: a first set of the plurality of CCs in the CA configuration are allocated a number of HARQ processes in the pool of HARQ processes that is no greater than a maximum number of HARQ processes supported by the UE; and a second set of the plurality of CCs in the CA configuration are allocated a number of HARQ processes in the pool of HARQ processes that is greater than a maximum number of HARQ processes supported by the UE.

Clause 23: The method according to any of clauses 1-21, wherein: at least one of the CCs of the plurality of CCs is associated with a first CORESET pool index and a second CORESET pool index; the first CORESET pool index is allocated a number of HARQ processes in the pool of HARQ processes that is no greater than a maximum number of HARQ processes supported by the UE; and the second CORESET pool index is allocated a number of HARQ processes in the pool of HARQ processes that is greater than a maximum number of HARQ processes supported by the UE.

Clause 24: The method according to any of clauses 1-23, wherein the pool of HARQ processes comprises at least one of a number of downlink HARQ processes or a number of uplink HARQ processes.

Clause 25: The method according to any of clauses 1-24, wherein the first CC is located in a first frequency range and the second CC is located in a second frequency range.

Clause 26: The method according to clause 25, wherein the second frequency range is higher than the first frequency range.

Clause 27: The method according to any of clauses 25-26, wherein the second frequency range comprises 60 Gigahertz (GHz).

Clause 28: The method according to any of clauses 1-27, wherein the first CC is associated with a first numerology and the second CC is associated with a different second numerology.

Clause 29: The method according to clause 28, wherein the first numerology comprises a first subcarrier spacing and the second numerology comprises a second subcarrier spacing.

Clause 30: The method according to clause 29, wherein the second subcarrier spacing is larger than the first subcarrier spacing.

Clause 31: A method for wireless communication by a BS, comprising: identifying a CA configuration in which at least a first CC of a plurality of CCs is aggregated with at least a second CC of the plurality of CCs; determining a HARQ configuration comprising a pool of HARQ processes shared by at least the first CC and the second CC; and signaling an indication of the HARQ configuration to a UE.

Clause 32: The method according to clause 31, wherein the pool of HARQ processes is shared by the plurality of CCs.

Clause 33: The method according to any of clauses 31-32, wherein the pool of HARQ processes is shared by a group of CCs, comprising the first CC and the second CC, within the plurality of CCs.

Clause 34: The method according to clause 33, wherein the group of CCs comprises CCs associated with a frequency band, a frequency range, a licensed spectrum, an unlicensed spectrum, or a subcarrier spacing.

Clause 35: The method according to any of clauses 31-34, further comprising receiving an indication of a first UE capability comprising a number of HARQ processes supported by the UE, wherein a number of HARQ processes in the pool of HARQ processes is determined based on the first UE capability.

Clause 36: The method according to any of clauses 31-35, further comprising receiving an indication of a second UE capability comprising at least one of a minimum number of HARQ processes or a maximum number of HARQ processes supported for each of the plurality of CCs, wherein the number of HARQ processes in the pool of HARQ processes is determined further based on the second UE capability.

Clause 37: The method according to any of clauses 31-35, wherein the first UE capability comprises an implicit indication of the number of HARQ processes supported by the UE.

Clause 38: The method according to any of clauses 31-37, wherein the implicit indication comprises a processing capability class associated with the UE.

Clause 39: The method according to any of clauses 31-38, wherein the HARQ configuration allocates (i) a first number of HARQ processes in the pool of HARQ processes to the first CC and (ii) a second number of HARQ processes in the pool of HARQ processes to the second CC.

Clause 40: The method according to clause 39, wherein a sum of the first number of HARQ processes and the second number of HARQ processes is no greater than a number of HARQ processes supported by the UE.

Clause 41: The method according to clause 39, wherein the first number of HARQ processes is based on a first weight associated with the first CC and the second number of HARQ processes is based on a second weight associated with the second CC.

Clause 42: The method according to clause 41, wherein the first weight is based on at least one of a subcarrier spacing, a frequency band, a frequency range, or a type of spectrum associated with the first CC and the second weight is based on at least one of a subcarrier spacing, a frequency band, a frequency range, or a type of spectrum associated with the second CC.

Clause 43: The method according to any of clauses 39-42, further comprising receiving a request for the first number of HARQ processes and the second number of HARQ processes, wherein the HARQ configuration is determined in response to the request.

Clause 44: The method according to clause 43, wherein the request is received via at least one of a UCI, a MAC-CE, or UE assistance information feedback.

Clause 45: The method according to clause 43, wherein the HARQ configuration is signaled via RRC signaling, a MAC-CE, or DCI signaling.

Clause 46: The method according to clause 45, wherein: the DCI comprises a HARQ process number ID field for each of the first CC and the second CC; a size of the HARQ process number ID field for the first CC is based on the first number of HARQ processes; and a size of the HARQ process number ID field for the second CC is based on the second number of HARQ processes.

Clause 47: The method according to any of clauses 39 and 41-46, wherein a sum of the first number of HARQ processes and the second number of HARQ processes is greater than a number of HARQ processes supported by the UE.

Clause 48: The method according to clause 47, wherein a number of active HARQ processes in the pool of HARQ processes at a given time instance is no greater than the number of HARQ processes supported by the UE.

Clause 49: The method according to any of clauses 31-48, wherein: a first set of the plurality of CCs in the CA configuration are allocated a number of HARQ processes in the pool of HARQ processes that is no greater than a maximum number of HARQ processes supported by the UE; and a second set of the plurality of CCs in the CA configuration are allocated a number of HARQ processes in the pool of HARQ processes that is greater than a maximum number of HARQ processes supported by the UE.

Clause 50: The method according to any of clauses 31-48, wherein: at least one of the CCs of the plurality of CCs is associated with a first CORESET pool index and a second CORESET pool index; the first CORESET pool index is allocated a number of HARQ processes in the pool of HARQ processes that is no greater than a maximum number of HARQ processes supported by the UE; and the second CORESET pool index is allocated a number of HARQ processes in the pool of HARQ processes that is greater than a maximum number of HARQ processes supported by the UE.

Clause 51: The method according to any of clauses 31-50, wherein the pool of HARQ processes comprises at least one of a number of downlink HARQ processes or a number of uplink HARQ processes.

Clause 52: The method according to any of clauses 31-50, wherein the first CC is located in a first frequency range and the second CC is located in a second frequency range.

Clause 53: The method according to clause 52, wherein the second frequency range is higher than the first frequency range.

Clause 54: The method according to any of clauses 52-53, wherein the second frequency range comprises 60 Gigahertz (GHz).

Clause 55: The method according to any of clauses 31-54, wherein the first CC is associated with a first numerology and the second CC is associated with a different second numerology.

Clause 56: The method according to clause 55, wherein the first numerology comprises a first subcarrier spacing and the second numerology comprises a second subcarrier spacing.

Clause 57: The method according to clause 56, wherein the second subcarrier spacing is larger than the first subcarrier spacing.

Clause 58: A method for wireless communication by a user equipment (UE), comprising: identifying a CA configuration in which at least a first CC of a plurality of CCs is aggregated with at least a second CC of the plurality of CCs; receiving, from a BS, a HARQ configuration indicating a pool of HARQ processes shared by at least the first CC and the second CC; and performing communications with the BS on at least one of the first CC or the second CC, based at least in part on the HARQ configuration.

Clause 59: The method according to clause 58, wherein: the pool of HARQ processes is shared by a group of CCs, comprising the first CC and the second CC, within the plurality of CCs; and the group of CCs comprises CCs associated with a frequency band, a frequency range, a licensed spectrum, an unlicensed spectrum, or a subcarrier spacing.

Clause 60: The method according to clause 58, further comprising signaling an indication of a first UE capability comprising a number of HARQ processes supported by the UE, wherein a number of HARQ processes in the pool of HARQ processes is based on the first UE capability.

Clause 61: The method according to clause 60, further comprising signaling an indication of a second UE capability comprising at least one of a minimum number of HARQ processes or a maximum number of HARQ processes supported for each of the plurality of CCs, wherein the number of HARQ processes in the pool of HARQ processes is further based on the second UE capability.

Clause 62: The method according to clause 60, wherein: the first UE capability comprises an implicit indication of the number of HARQ processes supported by the UE; and the implicit indication comprises a processing capability class associated with the UE.

Clause 63: The method according to clause 58, wherein the HARQ configuration allocates (i) a first number of HARQ processes in the pool of HARQ processes to the first CC and (ii) a second number of HARQ processes in the pool of HARQ processes to the second CC.

Clause 64: The method according to clause 63, wherein a sum of the first number of HARQ processes and the second number of HARQ processes is no greater than a number of HARQ processes supported by the UE.

Clause 65: The method according to clause 63, wherein: the first number of HARQ processes is based on a first weight associated with the first CC and the second number of HARQ processes is based on a second weight associated with the second CC; the first weight is based on at least one of a subcarrier spacing, a frequency band, a frequency range, or a type of spectrum associated with the first CC; and the second weight is based on at least one of a subcarrier spacing, a frequency band, a frequency range, or a type of spectrum associated with the second CC.

Clause 66: The method according to clause 63, further comprising signaling a request for the first number of HARQ processes and the second number of HARQ processes, wherein: the HARQ configuration is received in response to the request; and the request is signaled via at least one of a UCI, a MAC-CE, or UE assistance information feedback.

Clause 67: The method according to clause 66, wherein: the HARQ configuration is received via RRC signaling, a MAC-CE, or DCI signaling; the DCI comprises a HARQ process number ID field for each of the first CC and the second CC; a size of the HARQ process number ID field for the first CC is based on the first number of HARQ processes; and a size of the HARQ process number ID field for the second CC is based on the second number of HARQ processes.

Clause 68: The method according to clause 63, wherein a sum of the first number of HARQ processes and the second number of HARQ processes is greater than a number of HARQ processes supported by the UE.

Clause 69: The method according to clause 68, wherein a number of active HARQ processes in the pool of HARQ processes at a given time instance is no greater than the number of HARQ processes supported by the UE.

Clause 70: The method according to clause 68, further comprising dropping one or more of a number of active HARQ processes in the pool of HARQ processes, upon determining that the number of active HARQ processes in the pool of HARQ processes at a given time instance is larger than the number of HARQ processes supported by the UE, wherein: dropping one or more of the number of active HARQ processes based on a predetermined rule; and the predetermined rule is based on at least one of a cell ID, a HARQ process ID, or a CC ID.

Clause 71: The method according to clause 58, wherein: at least one of the CCs of the plurality of CCs is associated with a first CORESET pool index and a second CORESET pool index; the first CORESET pool index is allocated a number of HARQ processes in the pool of HARQ processes that is no greater than a maximum number of HARQ processes supported by the UE; and the second CORESET pool index is allocated a number of HARQ processes in the pool of HARQ processes that is greater than a maximum number of HARQ processes supported by the UE.

Clause 72: A method for wireless communication by a base station (BS), comprising: identifying a CA configuration in which at least a first CC of a plurality of CCs is aggregated with at least a second CC of the plurality of CCs; determining a HARQ configuration comprising a pool of HARQ processes shared by at least the first CC and the second CC; and signaling an indication of the HARQ configuration to a UE.

Clause 73: The method according to clause 72, wherein: the pool of HARQ processes is shared by a group of CCs, comprising the first CC and the second CC, within the plurality of CCs; and the group of CCs comprises CCs associated with a frequency band, a frequency range, a licensed spectrum, an unlicensed spectrum, or a subcarrier spacing.

Clause 74: The method according to clause 72, further comprising receiving an indication of a first UE capability comprising a number of HARQ processes supported by the UE, wherein a number of HARQ processes in the pool of HARQ processes is determined based on the first UE capability.

Clause 75: The method according to clause 74, further comprising receiving an indication of a second UE capability comprising at least one of a minimum number of HARQ processes or a maximum number of HARQ processes supported for each of the plurality of CCs, wherein the number of HARQ processes in the pool of HARQ processes is determined further based on the second UE capability.

Clause 76: The method according to clause 74, wherein: the first UE capability comprises an implicit indication of the number of HARQ processes supported by the UE; and the implicit indication comprises a processing capability class associated with the UE.

Clause 77: The method according to clause 72, wherein the HARQ configuration allocates (i) a first number of HARQ processes in the pool of HARQ processes to the first CC and (ii) a second number of HARQ processes in the pool of HARQ processes to the second CC.

Clause 78: The method according to clause 77, wherein a sum of the first number of HARQ processes and the second number of HARQ processes is no greater than a number of HARQ processes supported by the UE.

Clause 79: The method according to clause 77, wherein: the first number of HARQ processes is based on a first weight associated with the first CC and the second number of HARQ processes is based on a second weight associated with the second CC; the first weight is based on at least one of a subcarrier spacing, a frequency band, a frequency range, or a type of spectrum associated with the first CC; and the second weight is based on at least one of a subcarrier spacing, a frequency band, a frequency range, or a type of spectrum associated with the second CC.

Clause 80: The method according to clause 77, further comprising receiving a request for the first number of HARQ processes and the second number of HARQ processes, wherein: the HARQ configuration is determined in response to the request; and the request is received via at least one of a UCI, a MAC-CE, or UE assistance information feedback.

Clause 81: The method according to clause 80, wherein: the HARQ configuration is signaled via RRC signaling, a MAC-CE, or DCI signaling; the DCI comprises a HARQ process number ID field for each of the first CC and the second CC; a size of the HARQ process number ID field for the first CC is based on the first number of HARQ processes; and a size of the HARQ process number ID field for the second CC is based on the second number of HARQ processes.

Clause 82: The method according to clause 77, wherein a sum of the first number of HARQ processes and the second number of HARQ processes is greater than a number of HARQ processes supported by the UE.

Clause 83: The method according to clause 82, wherein a number of active HARQ processes in the pool of HARQ processes at a given time instance is no greater than the number of HARQ processes supported by the UE.

Clause 84: The method according to clause 72, wherein: a first set of the plurality of CCs in the CA configuration are allocated a number of HARQ processes in the pool of HARQ processes that is no greater than a maximum number of HARQ processes supported by the UE; and a second set of the plurality of CCs in the CA configuration are allocated a number of HARQ processes in the pool of HARQ processes that is greater than a maximum number of HARQ processes supported by the UE.

Clause 85: The method according to clause 72, wherein: at least one of the CCs of the plurality of CCs is associated with a first CORESET pool index and a second CORESET pool index; the first CORESET pool index is allocated a number of HARQ processes in the pool of HARQ processes that is no greater than a maximum number of HARQ processes supported by the UE; and the second CORESET pool index is allocated a number of HARQ processes in the pool of HARQ processes that is greater than a maximum number of HARQ processes supported by the UE.

Clause 86: An apparatus comprising a processing system, a receiver, and a transmitter, the apparatus being configured to perform the method according to any of clauses 1-30 and 58-71.

Clause 87: An apparatus comprising a processing system, a receiver, and a transmitter, the apparatus being configured to perform the method according to any of clauses 31-57 and 72-85.

Clause 88: An apparatus comprising means for performing the method according to any of clauses 1-30 and 58-71.

Clause 89: An apparatus comprising means for performing the method according to any of clauses 31-57 and 72-85.

Clause 90: A non-transitory computer-readable medium comprising computer-executable instructions that, when executed by one or more processors of a processing system, cause a UE to perform the method according to any of clauses 1-30 and 58-71.

Clause 91: A non-transitory computer-readable medium comprising computer-executable instructions that, when executed by one or more processors of a processing system, cause a BS to perform the method according to any of clauses 31-57 and 72-85.

Clause 92: A computer program product for wireless communication by a UE embodied on a computer-readable storage medium, the computer-readable storage medium comprising code for performing the method according to any of clauses 1-30 and 58-71.

Clause 93: A computer program product for wireless communication by a BS embodied on a computer-readable storage medium, the computer-readable storage medium comprising code for performing the method according to any of clauses 31-57 and 72-85.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 4 and/or FIG. 5.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user equipment (UE), comprising:
   identifying a carrier aggregation (CA) configuration in which at least a first component carrier (CC) of a plurality of CCs is aggregated with at least a second CC of the plurality of CCs;
   signaling an indication of a first UE capability comprising a number of HARQ processes supported by the UE;
   receiving, from a base station (BS), a hybrid automatic repeat request (HARQ) configuration indicating a pool of HARQ processes shared by at least the first CC and the second CC, wherein:
      the first CC is associated with a first subcarrier spacing and the second CC is associated with a second subcarrier spacing different from the first subcarrier spacing;
      the HARQ configuration allocates (i) a first number of HARQ processes, from the pool of HARQ processes, to the first CC based on the first subcarrier spacing and (ii) a second number of HARQ processes, from the pool of HARQ processes, to the second CC based on the second subcarrier spacing; and
      a number of HARQ processes in the pool of HARQ processes is based on the first UE capability; and
   performing communications with the BS on at least one of the first CC or the second CC, based at least in part on the HARQ configuration.

2. The method of claim 1, wherein:
   the pool of HARQ processes is shared by a group of CCs, comprising the first CC and the second CC, within the plurality of CCs; and
   the group of CCs comprises CCs associated with a frequency band, a frequency range, a licensed spectrum, or an unlicensed spectrum.

3. The method of claim 1, further comprising signaling an indication of a second UE capability comprising at least one of a minimum number of HARQ processes or a maximum number of HARQ processes supported for each of the plurality of CCs, wherein the number of HARQ processes in the pool of HARQ processes is further based on the second UE capability.

4. The method of claim 1, wherein:
   the first UE capability comprises an implicit indication of the number of HARQ processes supported by the UE; and
   the implicit indication comprises a processing capability class associated with the UE.

5. The method of claim 1, wherein a sum of the first number of HARQ processes and the second number of HARQ processes is no greater than the number of HARQ processes supported by the UE.

6. The method of claim 1, wherein:
   the first number of HARQ processes is further based on a first weight associated with the first CC and the second number of HARQ processes is further based on a second weight associated with the second CC;
   the first weight is based on at least one of the first subcarrier spacing, a frequency band, a frequency range, or a type of spectrum associated with the first CC; and
   the second weight is based on at least one of the second subcarrier spacing, a frequency band, a frequency range, or a type of spectrum associated with the second CC.

7. The method of claim 1, further comprising signaling a request for the first number of HARQ processes and the second number of HARQ processes, wherein:
   the HARQ configuration is received in response to the request; and
   the request is signaled via at least one of a uplink control information (UCI), a medium access control control element (MAC-CE), or UE assistance information feedback.

8. The method of claim 7, wherein:
   the HARQ configuration is received via radio resource control (RRC) signaling, a medium access control control element (MAC-CE), or downlink control information (DCI) signaling;
   the DCI comprises a HARQ process number identifier (ID) field for each of the first CC and the second CC;
   a size of the HARQ process number ID field for the first CC is based on the first number of HARQ processes; and
   a size of the HARQ process number ID field for the second CC is based on the second number of HARQ processes.

9. The method of claim 1, wherein a sum of the first number of HARQ processes and the second number of HARQ processes is greater than the number of HARQ processes supported by the UE.

10. The method of claim 9, wherein a number of active HARQ processes in the pool of HARQ processes at a given time instance is no greater than the number of HARQ processes supported by the UE.

11. The method of claim 9, further comprising dropping one or more of a number of active HARQ processes in the pool of HARQ processes, upon determining that the number of active HARQ processes in the pool of HARQ processes at a given time instance is larger than the number of HARQ processes supported by the UE, wherein:
   dropping one or more of the number of active HARQ processes based on a predetermined rule; and
   the predetermined rule is based on at least one of a cell identifier (ID), a HARQ process ID, or a CC ID.

12. The method of claim 1, wherein:
   at least one of the plurality of CCs is associated with a first CORESET pool index and a second CORESET pool index;
   the first CORESET pool index is allocated a number of HARQ processes in the pool of HARQ processes that is no greater than a maximum number of HARQ processes supported by the UE; and
   the second CORESET pool index is allocated a number of HARQ processes in the pool of HARQ processes that is greater than a maximum number of HARQ processes supported by the UE.

13. An apparatus for wireless communication, comprising:
   a processing system comprising:
      a memory comprising computer-executable instructions; and
      one or more processors configured to collectively execute the computer-executable instructions and cause the processing system to identify a carrier aggregation (CA) configuration in which at least a first component carrier (CC) of a plurality of CCs is aggregated with at least a second CC of the plurality of CCs;

a transmitter configured to transmit, to a base station (BS), an indication of a first user equipment (UE) capability comprising a number of HARQ processes supported by the apparatus; and a receiver configured to receive, from a base station (BS), a hybrid automatic repeat request (HARQ) configuration indicating a pool of HARQ processes shared by at least the first CC and the second CC, wherein the first CC is associated with a first subcarrier spacing and the second CC is associated with a second subcarrier spacing different from the first subcarrier spacing, wherein the HARQ configuration allocates (i) a first number of HARQ processes, from the pool of HARQ processes, to the first CC based on the first subcarrier spacing and (ii) a second number of HARQ processes, from the pool of HARQ processes, to the second CC based on the second subcarrier spacing, wherein a number of HARQ processes in the pool of HARQ processes is based on the first UE capability, wherein the one or more processors are further configured to cause the processing system to perform communications with the BS on at least one of the first CC or the second CC, based at least in part on the HARQ configuration.

14. The apparatus of claim 13, wherein the transmitter is further configured to transmit an indication of a second UE capability comprising at least one of a minimum number of HARQ processes or a maximum number of HARQ processes supported for each of the plurality of CCs, wherein the number of HARQ processes in the pool of HARQ processes is further based on the second UE capability.

15. The apparatus of claim 13, wherein:
the first UE capability comprises an implicit indication of the number of HARQ processes supported by the UE; and
the implicit indication comprises a processing capability class associated with the UE.

16. A method for wireless communication by a base station (BS), comprising:
identifying a carrier aggregation (CA) configuration in which at least a first component carrier (CC) of a plurality of CCs is aggregated with at least a second CC of the plurality of CCs;
receiving an indication of a first user equipment (UE) capability comprising a number of hybrid automatic repeat request (HARQ) processes supported by a UE;
determining a HARQ configuration comprising a pool of HARQ processes shared by at least the first CC and the second CC, wherein:
the first CC is associated with a first subcarrier spacing and the second CC is associated with a second subcarrier spacing different from the first subcarrier spacing;
the HARQ configuration allocates (i) a first number of HARQ processes, from the pool of HARQ processes, to the first CC based on the first subcarrier spacing and (ii) a second number of HARQ processes, from the pool of HARQ processes, to the second CC based on the second subcarrier spacing; and
a number of HARQ processes in the pool of HARQ processes is determined based on the first UE capability; and
signaling an indication of the HARQ configuration to the UE.

17. The method of claim 16, wherein:
the pool of HARQ processes is shared by a group of CCs, comprising the first CC and the second CC, within the plurality of CCs; and
the group of CCs comprises CCs associated with a frequency band, a frequency range, a licensed spectrum, or an unlicensed spectrum.

18. The method of claim 16, further comprising receiving an indication of a second UE capability comprising at least one of a minimum number of HARQ processes or a maximum number of HARQ processes supported for each of the plurality of CCs, wherein the number of HARQ processes in the pool of HARQ processes is determined further based on the second UE capability.

19. The method of claim 16, wherein:
the first UE capability comprises an implicit indication of the number of HARQ processes supported by the UE; and
the implicit indication comprises a processing capability class associated with the UE.

20. The method of claim 16, wherein a sum of the first number of HARQ processes and the second number of HARQ processes is no greater than the number of HARQ processes supported by the UE.

21. The method of claim 16, wherein:
the first number of HARQ processes is further based on a first weight associated with the first CC and the second number of HARQ processes is further based on a second weight associated with the second CC;
the first weight is based on at least one of the first subcarrier spacing, a frequency band, a frequency range, or a type of spectrum associated with the first CC; and
the second weight is based on at least one of the second subcarrier spacing, a frequency band, a frequency range, or a type of spectrum associated with the second CC.

22. The method of claim 16, further comprising receiving a request for the first number of HARQ processes and the second number of HARQ processes, wherein:
the HARQ configuration is determined in response to the request; and
the request is received via at least one of a uplink control information (UCI), a medium access control control element (MAC-CE), or UE assistance information feedback.

23. The method of claim 22, wherein:
the HARQ configuration is signaled via radio resource control (RRC) signaling, a medium access control control element (MAC-CE), or downlink control information (DCI) signaling;
the DCI comprises a HARQ process number identifier (ID) field for each of the first CC and the second CC;
a size of the HARQ process number ID field for the first CC is based on the first number of HARQ processes; and
a size of the HARQ process number ID field for the second CC is based on the second number of HARQ processes.

24. The method of claim 16, wherein a sum of the first number of HARQ processes and the second number of HARQ processes is greater than the number of HARQ processes supported by the UE.

25. The method of claim 24, wherein a number of active HARQ processes in the pool of HARQ processes at a given time instance is no greater than the number of HARQ processes supported by the UE.

26. The method of claim 16, wherein:
a first set of the plurality of CCs in the CA configuration are allocated a number of HARQ processes in the pool of HARQ processes that is no greater than a maximum number of HARQ processes supported by the UE; and
a second set of the plurality of CCs in the CA configuration are allocated a number of HARQ processes in the pool of HARQ processes that is greater than a maximum number of HARQ processes supported by the UE.

27. The method of claim 16, wherein:
at least one of the plurality of CCs is associated with a first CORESET pool index and a second CORESET pool index;
the first CORESET pool index is allocated a number of HARQ processes in the pool of HARQ processes that is no greater than a maximum number of HARQ processes supported by the UE; and
the second CORESET pool index is allocated a number of HARQ processes in the pool of HARQ processes that is greater than a maximum number of HARQ processes supported by the UE.

28. An apparatus for wireless communication, comprising:
a receiver configured to receive an indication of a first user equipment (UE) capability comprising a number of hybrid automatic repeat request (HARQ) processes supported by a UE;
a processing system comprising:
a memory comprising computer-executable instructions; and
one or more processors configured to collectively execute the computer-executable instructions and cause the processing system to:
identify a carrier aggregation (CA) configuration in which at least a first component carrier (CC) of a plurality of CCs is aggregated with at least a second CC of the plurality of CCs; and
determine a hybrid automatic repeat request (HARQ) configuration comprising a pool of HARQ processes shared by at least the first CC and the second CC, wherein the first CC is associated with a first subcarrier spacing and the second CC is associated with a second subcarrier spacing different from the first subcarrier spacing, wherein the HARQ configuration allocates (i) a first number of HARQ processes, from the pool of HARQ processes, to the first CC based on the first subcarrier spacing and (ii) a second number of HARQ processes, from the pool of HARQ processes, to the second CC based on the second subcarrier spacing, and wherein a number of HARQ processes in the pool of HARQ processes is determined based on the first UE capability; and
a transmitter configured to transmit an indication of the HARQ configuration to the UE.

29. The apparatus of claim 28, wherein the receiver is further configured to receive an indication of a second UE capability comprising at least one of a minimum number of HARQ processes or a maximum number of HARQ processes supported for each of the plurality of CCs, wherein the number of HARQ processes in the pool of HARQ processes is determined further based on the second UE capability.

30. The apparatus of claim 28, wherein:
the first UE capability comprises an implicit indication of the number of HARQ processes supported by the UE; and
the implicit indication comprises a processing capability class associated with the UE.

* * * * *